US012350984B2

(12) United States Patent
Skierka et al.

(10) Patent No.: US 12,350,984 B2
(45) Date of Patent: Jul. 8, 2025

(54) DETACHABLE CAB FOR AN AMPHIBIOUS VEHICLE

(71) Applicant: S6 INNOVATIONS INC., Lethbridge (CA)

(72) Inventors: John Skierka, Lethbridge (CA); Ken Alexander, Lethbridge (CA)

(73) Assignee: S6 INNOVATIONS INC., Lethbridge (CA)

( * ) Notice: Subject to any disclaimer, the term of this patent is extended or adjusted under 35 U.S.C. 154(b) by 555 days.

(21) Appl. No.: 17/784,012

(22) PCT Filed: Dec. 8, 2020

(86) PCT No.: PCT/CA2020/051689
§ 371 (c)(1),
(2) Date: Jun. 9, 2022

(87) PCT Pub. No.: WO2021/113964
PCT Pub. Date: Jun. 17, 2021

(65) Prior Publication Data
US 2023/0028932 A1 Jan. 26, 2023

Related U.S. Application Data

(60) Provisional application No. 62/945,649, filed on Dec. 9, 2019.

(51) Int. Cl.
*B60F 3/00* (2006.01)
(52) U.S. Cl.
CPC ................................ *B60F 3/0038* (2013.01)

(58) Field of Classification Search
CPC ............. B60F 3/0038; B60F 3/00; B60F 3/38
See application file for complete search history.

(56) References Cited

U.S. PATENT DOCUMENTS

| | | | |
|---|---|---|---|
| 1,483,404 A | 2/1924 | Wozniak | |
| 1,832,046 A | 11/1931 | Olson | |
| 5,775,226 A | 7/1998 | Futami et al. | |
| 5,916,672 A * | 6/1999 | Reeves | B32B 5/18 428/318.6 |

(Continued)

FOREIGN PATENT DOCUMENTS

| | | |
|---|---|---|
| CN | 2761518 Y | 3/2006 |
| FR | 2580581 A1 * | 10/1986 |
| JP | H06239293 A | 8/1994 |

OTHER PUBLICATIONS

"International Search Report and Written Opinion of the International Searching Authority," issued in connection with Int'l Appl. No. PCT/CA2020/051689, dated Jan. 28, 2021 (8 pages).

(Continued)

*Primary Examiner* — Stephen P Avila
(74) *Attorney, Agent, or Firm* — HOLLAND & HART LLP

(57) ABSTRACT

Disclosed herein is a detachable cab apparatus for an amphibious vehicle. The detachable cab comprises an enclosure to house the operator, an independent flotation system and a detachment apparatus configured for detachment of the cab from the amphibious vehicle. Additional safety features to avoid injury, or sustain life, of the operator in the detached cab are also provided.

19 Claims, 6 Drawing Sheets

(56) References Cited

U.S. PATENT DOCUMENTS

2004/0020418 A1 2/2004 Murphy et al.
2014/0154934 A1 6/2014 Brown

OTHER PUBLICATIONS

China Patent Office "Office Action", issued in connection with China Patent Application No. 202080095517.7 dated Feb. 26, 2025 (18 pages) (10 pages of English Translation and 8 pages Original Document).

\* cited by examiner

DETACHABLE CAB FOR AN AMPHIBIOUS VEHICLE

CROSS-REFERENCE TO RELATED APPLICATIONS

This application is a national stage filing under 35 U.S.C. 371 of International Application No. PCT/CA2020/051689 filed Dec. 8, 2020, which is hereby incorporated by reference in its entirety. and which claims the benefit of and priority to U.S. Provisional Patent Application No. 62/945,649 filed Dec. 9, 2019, which is hereby incorporated by reference in its entirety.

TECHNICAL FIELD

The present disclosure generally relates to detachable cabs for amphibious vehicles. In particular, the present disclosure relates to detachable cabs having independent flotation capacity along with a safe enclosure for the occupant and may comprise a number of additional features to increase the likelihood of occupant survival following an emergency.

BACKGROUND

Amphibious vehicles and equipment provide a convenient means to traverse and/or operate on both land and water. Although the automotive industry continues to advance safety features for the operation of vehicles on land, there exists a gap in technology regarding safety features for amphibious vehicles on water, particularly in regards to work equipment such as amphibious excavators. Indeed, deadly accidents involving amphibious vehicles have occurred recently on water.

Difficulties in maneuvering waters in poor weather conditions and assessing underwater terrain, among other factors, makes operation of amphibious vehicles on water a potentially life-threatening activity. This is particularly the case for engineered dam and dyke systems used to capture oil sand tailings, as well as other types of tailings ponds. The management of oil sands tailings is one of the more difficult environmental challenges facing the oil sands industry. By late 2017, it was estimated that tailings ponds in Alberta held about 1.2 trillion litres of contaminated water and covered about 220 square kilometres. Amphibious excavators are frequently used in the management of these tailing ponds, and rollover incidents have occurred.

Attempts have been made to improve the safety of operating amphibious vehicles in water by improving vehicle flotation, water stability and water maneuverability. Such safety advances decrease the chances of the amphibious vehicle suffering a hazardous accident on water, but they do not eliminate them.

A need exists for an improved amphibious vehicle cabin that provides a means to safely escape if an emergency, such as a vehicle upset or fire, is experienced on water.

SUMMARY

The present disclosure provides a detachable cab for an amphibious vehicle. In particular, the present disclosure provides an operator cab that is automatically or manually detachable from an amphibious vehicle, thereby enabling the operator and possibly other occupants to escape from the amphibious vehicle in an emergency situation, such as an upset.

In an embodiment, the present disclosure relates to a detachable cab for an amphibious vehicle the detachable cab comprising an enclosure to house the operator; an independent flotation system; and a detachment apparatus configured for detachment of the cab from the amphibious vehicle.

Further aspects of the detachable cab are described herein, including embodiments and features to avoid injury or sustain life of the operator in the detached cab.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
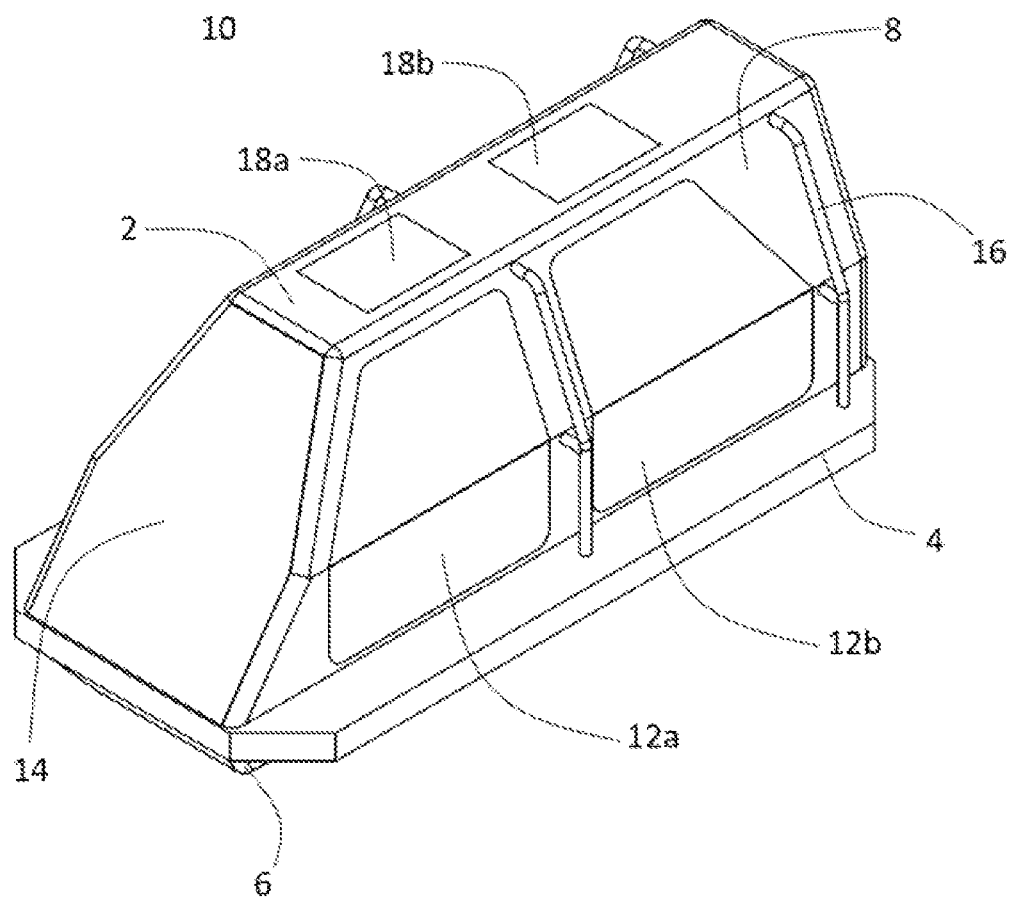
FIG. 1 shows a perspective view of a detachable cab for amphibious vehicles in accordance with certain embodiments.

The present disclosure relates to a detachable cab for an amphibious vehicle. The detachable cab comprises an enclosure to house an operator and an independent flotation system. The detachable cab further comprises a detachment apparatus configured for detachment of the cab from the amphibious vehicle.

As used herein, the term "amphibious vehicle" refers to any vehicle or moving equipment (e.g. excavator) that can traverse or travel on both land and water. Without limitation, the amphibious vehicle will typically have wheels or a continuous track for propulsion on land. The same mode of propulsion may be used in the water, or an alternate mode such as a propeller. In water, the amphibious vehicle may float or drive along the bottom. The amphibious vehicle may be a newly designed vehicle equipped with the detachable cab as described herein, or may be an existing vehicle that is retrofit with the detachable cab.

Embodiments of the detachable cab disclosed herein enable an amphibious vehicle operator to escape from the vehicle in an emergency. As used herein, the term "emergency" is intended to encompass any situation in which it would be desirable for the operator to exit, evacuate or escape from the amphibious vehicle, including to evacuate the vicinity of the vehicle. In an embodiment, the emergency may be a situation in which the amphibious vehicle is involved in an accident (e.g. a collision). In an embodiment, the emergency may be a situation in which the amphibious vehicle catches on fire. In an embodiment, the emergency may be a situation in which the amphibious vehicle is upset. By "upset", it is meant to encompass both a situation where the vehicle has fallen over or where it is in the process of falling over. The term "upset" should be understood to be synonymous with overturn, tip over, knock over, capsize or upend. The amphibious vehicle may become upset for any reason, including for example environmental conditions (e.g. underwater terrain, wind, etc.) or operator error.

An advantage of the detachable cab of the present disclosure is the ability to detach the cab from the amphibious vehicle manually or automatically to allow the operator to escape from the vehicle and/or its vicinity. In an embodiment, the detachable cab is configured to be manually detached in a non-upset emergency and automatically detached in an upset emergency.

In an embodiment, the emergency may be a situation in which the amphibious vehicle has capsized or is capsizing. The detachable cab disclosed herein is advantageous in allowing the operator to escape from the vehicle within the safe enclosure of the cab. The detachable cab has an independent flotation system such that it will float on the surface of the water, even if the cab is detached from the vehicle while underwater. Thus, the independent flotation system prevents the detached cab and the operator from being trapped underwater. In some embodiments, the detachable cab will comprise additional safety equipment to protect the operator, such as a roll cage, padding, thermal insulation or life support equipment. In essence, the detachable cab becomes a life-pod to maintain and protect the operator after the amphibious vehicle has capsized.

In some embodiments, the detachable cab will comprise a water inlet to allow water to enter the cab in an upset vehicle situation. This has advantages in certain circumstances of creating an equilibrium with the external environment and giving the operator time to escape from the detachable cab. In some embodiments, the detachable cab is self-righting like a buoy and/or has an escape hatch. Such embodiments assist in enabling the operator to safely escape from the detachable cab.

As used herein, the term "operator" is intended to encompass any occupant within the detachable cab. The operator may be any one or more persons who control the operation of the amphibious vehicle, any one or more passenger occupants, or any combination thereof. In an embodiment, the operator is a person who controls the movement of the amphibious vehicle. In an embodiment, the operator is a person who does not control the movement of the amphibious vehicle. The occupant who does not control the movement of the vehicle may, for example, provide instruction to an operator who does control the vehicle.

As used herein, by "detachable cab" it is meant that the cab is capable of being detached from the amphibious vehicle. In an embodiment, "detached" means that there is no interconnection between any part of the detachable cab and the amphibious vehicle. In other embodiments, "detached" may mean that one or more components of the vehicle cab remain connected, but the body of the cab detaches from the vehicle. For example and without limitation, the detached cab may remain connected to the vehicle via a power cable, air supply hose, or other flexible and extendable structure. In its detached configuration, the enclosure that houses the operator is detached from the vehicle. In an embodiment, the enclosure is separated from the vehicle by a distance of at least 5 feet, at least 10 feet, at least 15 feet, at least 20 feet, at least 25 feet, at least 30 feet, at least 35 feet, at least 40 feet, at least 45 feet, at least 50 feet, or more when the cab is detached from the vehicle.

The enclosure of the detachable cab may be any structure that is suitable for housing an operator in a manner that the operator is protected from the external environment in an emergency. Generally, the enclosure is a sealable structure that comprises one or more windows, one or more doors, a terminal or control panel, a seat, and any other equipment used to operate the amphibious vehicle. By "sealable", it is meant that the detachable cab can alternate between a sealed and unsealed state. Typically, when the amphibious vehicle is on water, the detachable cab will be in a sealed state.

In an embodiment, the enclosure is a structure similar to the cabin of a heavy equipment vehicle, such as a dump truck or an excavator. In an embodiment, the enclosure is a structure similar to the closed cabin of an off-road vehicle, such as an ATV. In an embodiment, the enclosure is capable of housing a single operator. In another embodiment, the enclosure is capable of housing two or more operators.

In another embodiment, the enclosure comprises a core frame structure. The core frame structure may comprise a lower buoyant framework for providing buoyancy to the enclosure and an upper protective framework for protecting the operator and supporting components of the enclosure such as windows, doors, hatches, etc. In an embodiment, the upper protective framework and the lower buoyant framework may be interconnected by way of a subframe, which may also provide additional structural support to the core frame structure. In an embodiment, the subframe and the lower buoyant framework are formed as a single integrated framework.

The upper protective framework is for protecting the operator and supporting components of the enclosure. In an embodiment, the upper protective framework may be generally shaped to provide an enclosure that has a structure similar to that conventionally used for heavy equipment or off-road vehicles, as described above. In an embodiment, the upper protective framework may be shaped to increase the hydrodynamics of the enclosure. In an embodiment, the upper protective framework may be configured to function as a roll cage for the enclosure, as will be described in greater detail below.

The lower buoyant framework may be configured to provide buoyancy to the enclosure as or in addition to the independent flotation system. In an embodiment, the lower buoyant framework may have a "tub-like" shape in that it has a base from which one or more walls extend upwardly therefrom. In an embodiment, the lower buoyant framework may comprise a base from which one or more walls extend upwardly at an angle of greater than 90° therefrom. In another embodiment, the lower buoyant framework may comprise a base from which one or more walls extend perpendicularly therefrom. It is noted that the base may be flat, curved, rounded, etc.

In an embodiment, the lower buoyant framework and the upper protective framework may be comprised of metal components such as formed metal sections, metal tubing, and the like welded together. The metal components may be formed of a metal such as steel. In an embodiment, metal components may comprise a core material therewithin to provide additional structural strength or flotation capabilities to the core frame structure. In such embodiments, the core material may comprise for example a fiber-reinforced plastic (FRP) such as a fiberglass. In an embodiment, the metal components may be arranged to define the walls and base or top of the lower buoyant framework and upper protective framework, respectively. In the case of the upper protective framework, the metal components may be arranged to define an area into which components such as windows, doors, hatches, and the like may be installed and supported. In a further embodiment, the lower buoyant framework and the upper protective framework may be wrapped in a flotation material.

The subframe, if present, is for interconnecting the lower buoyant framework and the upper protective framework while providing additional structural support to the core frame structure. A bottommost portion of the upper protective framework and a topmost portion of the lower buoyant framework may be secured to the subframe to thereby interconnect the two frameworks. In an embodiment, the subframe may be comprised of one or more hollow structural sections (HSSs), formed sections, or the like. The HSSs may have a rectangular, circular, or oval profile (i.e. cross-section). The formed sections may have a C-shaped profile, a U-shaped profile, J-shaped profile, or the like. In an embodiment, the subframe may be formed of a metal such as steel. In a further embodiment, the subframe may comprise a core material or may be wrapped in a flotation material, as described above in relation to the lower buoyant framework and the upper protective framework. In a yet further embodiment, the subframe may have a generally rectangular shape. Of course, other shapes are possible and are contemplated. For example, in an embodiment, the subframe may be generally bullet-shaped.

In an embodiment, the subframe may further comprise one or more support legs secured to the lower buoyant framework for providing additional structural support to the enclosure. In such embodiments, the subframe and the lower buoyant framework may be considered "a single integrated structure", as previously described herein. In an embodiment, the one or more legs may be secured to a lower surface of the subframe and to a base of the lower buoyant framework. In such embodiments, the one or more support legs of the subframe may define one or more walls of the lower buoyant framework. In an embodiment, the one or more support legs may comprise an HSS, a formed channel (e.g. a formed U-shaped channel), metal tubing, or any combination thereof.

In an embodiment, one or more of the upper protective framework, subframe, and lower buoyant framework comprise one or more connection points for securing components to the core frame structure. The connection points may be in the form of apertures into which fasteners such as screws, bolts, or the like may be inserted to thereby secure a component to the core frame structure. Non-limiting examples of components that may be secured to the core frame structure include the independent flotation system, handlebars, bumpers for additional impact resistance, storage compartments, one or more additional enclosures, the detachment apparatus, etc.

In an embodiment, the enclosure may comprise an exterior shell secured to the core frame structure for protecting the core frame structure and operator(s) and/or components that may be contained therein. The exterior shell defines exterior walls of the enclosure and may have cut-outs formed therein for the positioning of windows, doors, hatches, etc. In an embodiment, the exterior shell may comprise one or more panels secured to the core frame structure. The panels may comprise metal panels (e.g. steel panels), composite panels, or a combination thereof. The panels may be secured to each other and/or the core frame structure by way of welding, adhesives, fasteners such as screws, bolts, and the like, or a combination thereof. Further, in an embodiment, the panels may be flat panels or may instead be shaped to provide a particular aesthetic appearance or additional structural strength (e.g. dent resistance).

In an embodiment, the exterior shell comprises one or more additional reinforcing components. The one or more additional reinforcing components may be secured to a surface of the exterior shell to provide additional structural support to the exterior shell and/or core frame structure of the enclosure and may also provide additional operator comfort (e.g. by dampening vibrations experienced by the enclosure). In an embodiment, the exterior shell comprises the one or more additional reinforcing components secured to an inside surface thereof (e.g. between the core frame structure and the exterior shell). In an embodiment, the exterior shell comprises the one or more additional reinforcing components secured to an outside surface thereof. The one or more reinforcing components may comprise one or more bars, rods, formed sections, or the like extending across a surface of the exterior shell. In an embodiment, the one or more reinforcing components may be formed of an FRP, a metal, or a combination thereof.

In an embodiment, the enclosure may comprise an interior shell secured within the core frame structure for providing an operator additional protection from leaks, fire, electrical shocks, chemical corrosion, etc. The interior shell defines inside walls of the enclosure and may have cut-outs formed therein for the positioning of windows, doors, hatches, etc. The interior shell may be formed of a composite material such as an FRP. In one non-limiting example, the interior shell may be formed of a fiberglass bonded to a polymer mat (e.g. a non-woven polyester mat). In an embodiment, the interior shell may be secured to the core frame structure by way of an adhesive, one or more fasteners, or the like. In an embodiment, the interior shell may comprise one or more panels. If a plurality of panels are present, the panels may be bonded together using, for example, a silicone sealant, fibreglass tape, or a combination thereof. The panels may be flat or shaped to provide buoyancy balance, dent resistance, and/or a particular aesthetic appearance. In an embodiment, the interior shell comprises a tub for positioning in the lower buoyant framework of the core frame structure. The tub may be coated with a rubber to provide grip to an operator within the enclosure. In an embodiment, the interior shell comprises one or more rubber strips (e.g. neoprene strips) for positioning between the shell and the core frame structure to provide additional damping of vibrations experienced by the enclosure.

In an embodiment, the enclosure is positioned above the independent flotation system, such that when the cab is detached from the vehicle the enclosure will be oriented to float above the water to keep the operator safe. In another embodiment, the independent flotation system is slightly above the bottom of the enclosure (e.g. above the lower buoyant framework described above, if present) to provide flotation stability while still maintaining the majority of the enclosure above the water. In another embodiment, the independent flotation system is itself made, in full or in part, from floatable material.

The detachable cab may have more than one enclosure. In an embodiment, the detachable cab has 1, 2, 3, 4, 5, or more enclosures. At least one of the enclosures will be for housing an operator, while other enclosures (if present) may provide for storage or contain equipment used for operation of the amphibious vehicle or for operator safety (e.g. life-saving equipment). In an embodiment, the detachable cab has 1 or 2 enclosures that house an operator. In an embodiment, the detachable cab has 1 enclosure that does not house an operator.

In an embodiment, the enclosure of the detachable cab has a roll cage. The roll cage may be formed by the upper protective framework, if present, as described above, or may be in addition to the upper protective framework. Typically, the roll cage is for protection of the operator when the amphibious vehicle is operated on land. However, the roll cage may also protect the operator in the water, such as when the detachable cab is detached from the amphibious vehicle. When detached, the cab may be more prone to hitting other objects, particularly if the cab does not have its own mode of propulsion. In addition, the roll cage may protect the operator in the event of upset in the water, such as in shallow waters. In an embodiment, the roll cage is comprised of strong yet lightweight material, such as carbon fiber. Such embodiments may be advantageous so as to minimally interfere with the self-righting capabilities provided in some aspects of the detachable cab of the present disclosure. In an embodiment, the roll cage is comprised of a metal or metal alloy, such as steel. In an embodiment, the roll cage may be wrapped in or otherwise contain a flotation material, to provide or aid in independent flotation of the enclosure of the cab.

In an embodiment, the inside walls and inner ceiling of the detachable cab are fully or partially covered with padding to absorb shock from impact with the operator and/or objects which may occur in an emergency, thereby limiting damage to the cab and operator and/or cab and objects. In an embodiment, the padding is made of foam, packed fibers such as cotton, compressible material such as polystyrene or a combination thereof. In an embodiment, the padding may dually function as thermal insulation as described herein.

In an embodiment, the enclosure of the detachable cab is comprised of at least one window and at least one door. The enclosure may comprise any number of windows and doors. In an embodiment, each enclosure comprises 1, 2, 3, 4, 5 or more windows. In an embodiment, each enclosure comprises 1, 2, 3 or more doors. The doors as referenced here are distinct from, and in addition to, the escape hatch described elsewhere herein. In an embodiment, the enclosure has at least three windows (front and two sides) and a door.

In preferred embodiments, when the windows and doors of the enclosure are closed, the enclosure of the cab becomes a sealed enclosure and protects the operator from external elements. By "sealed enclosure", it is meant that the enclosure is impervious to or more slowly penetrable by one or more external elements. In particular, in some embodiments, it is preferred that the sealed enclosure is impervious to water. In other embodiments, it is preferred that the passage of water is substantially restricted (such as embodiments of the cab that include a water inlet for equalization purposes). Regions of the enclosure that are not permanently closed and sealed, such as windows and doors that open, may comprise a gasket or plurality of gaskets, or any other available sealing means, to seal the opening when the window or door is closed. The sealing means restricts the passage of water. By "restricts the passage of water", as used herein, it is meant that the structure or closure is rendered impervious to water or is substantially less penetrable by water. The windows and doors may comprise dogs (i.e. cams) to wedge the window or door shut sufficiently to make the seal watertight. In an embodiment, these dogs are used in the event of an emergency to ensure the windows and doors are sealed.

In an embodiment, the enclosure of the detachable cab may further comprise thermal insulation. The thermal insulation will assist in maintaining a desired temperature inside the enclosure by delaying or preventing the penetration of hot or cold external temperatures (e.g. by reduced thermal conduction). The thermal insulation may be made from any insulation material that is suitable to the climate in which the amphibious vehicle will operate. In an embodiment, the thermal insulation is made of fiberglass, cellulose, rock wool, polystyrene foam, urethane foam, vermiculite, perlite, cork, or any combination thereof. The thermal insulation may partially or completely surround the internal compartment of the enclosure. In an embodiment, the thermal insulation is within the walls of the enclosure.

The windows of the enclosure may be made of glass. In other embodiments, which may be preferred in order to protect the operator in an emergency and/or upon detachment of the cab, the window may be comprised of a shatterproof or shatter-resistant, transparent material such as a polycarbonate acrylic-based material. In some embodiments, the windows may be removable such that an operator may exit the enclosure therethrough if need be.

In an embodiment, the detachable cab, including the enclosure, has a reduced height as compared to a conventional operator cab. This special design to provide a reduced height may provide additional stability to the amphibious vehicle when in operation, and upon detachment of the cab from the vehicle may provide a more stable vessel to float on the surface of the water given the reduce height of the center of gravity. In an embodiment, the detachable cab is of a height that is just sufficient to house the operator in the enclosure. In a more particular embodiment, the detachable cab is of a height that is just sufficient to house the operator when the operator is standing in the enclosure. In an even more particular embodiment, the detachable cab is of a height that is just sufficient to house the operator when the operator is crouched or sitting in the enclosure.

In an embodiment, the height of the detachable cab is between 4 feet and 8 feet, more preferably between 4 feet and 7 feet. In an embodiment, the height of the detachable cab is less than 7 feet, less than 6 feet, less than 5 feet, or less than 4 feet. In an embodiment, the height of the detachable cab is about 4.0 feet, about 4.5 feet, about 5.0 feet, about 5.5 feet, about 6.0 feet or about 6.5 feet. The measurement of the height may be from the bottom to the top of the enclosure of the detachable cab, and thereby exclude any of the components of the detachment apparatus.

In an embodiment, the detachable cab, including the enclosure, has an increased width and/or length as compared to a conventional operator cab. This special design to provide an increased width and/or length may provide additional stability to the amphibious vehicle when in operation, and upon detachment of the cab from the vehicle may provide a more stable vessel to float on the surface of the water given the enlarged girth or bottom surface area.

In an embodiment, the width (measured from side to side) of the detachable cab is between 3 feet and 10 feet, more preferably between 4 feet and 8 feet. In an embodiment, the width of the detachable cab is more than 4.0 feet, more than 4.5 feet, or more than 5.0 feet. In an embodiment, the width of the detachable cab is about 4.5 feet, about 5.0 feet, about 5.5 feet, about 6.0 feet, about 6.5 feet, about 7.0 feet or about 7.5 feet. The measurement of the width may be from the one side to the opposite side of the enclosure of the detachable cab, and thereby exclude any of the independent flotation components if they extend outwards of the enclosure.

In an embodiment, the length (measured from front to back) of the detachable cab is between 4 feet and 15 feet, more preferably between 6 feet and 12 feet. In an embodiment, the length of the detachable cab is more than 6.0 feet, more than 6.5 feet, or more than 7.0 feet. In an embodiment, the length of the detachable cab is about 6.5 feet, about 7.0 feet, about 7.5 feet, about 8.0 feet, about 8.5 feet, about 9.0 feet, about 9.5 feet or about 10.0 feet. The measurement of the length may be from the front end to the back end of the enclosure of the detachable cab, and thereby exclude any of the independent flotation components if they extend outwards of the enclosure.

The detachable cab comprises a detachment apparatus configured for detachment of the cab from the amphibious vehicle. By "detachment apparatus", it is meant to refer to any means by which the cab can be manually and/or automatically detached from the vehicle. The detachment apparatus permits the detachable cab to demountably engage the amphibious vehicle. The detachment apparatus may be a single structure or a combination of components. The detachment apparatus may be a fixed structure on the vehicle cab that reversibly attaches to a component of the amphibious vehicle.

In an embodiment, the detachment apparatus may be a frame or undercarriage of the cab that comprises release components to detach the cab from the vehicle. This system may be manual, automated, or a combination of both. For example, the frame or undercarriage may comprise rotatable hooks that can engage and disengage from a bar- or peg-type structure on the amphibious vehicle, or vice versa the amphibious vehicle may comprise rotatable hooks that can engage and disengage from the frame or undercarriage of the cab, or any combination thereof.

In an embodiment, the detachment apparatus may comprise slidable pegs that can egress and regress from one or more sides of the detachable cab, one or more sides of the amphibious vehicle, or a combination thereof. When the pegs are extended out of the detachable cab or the vehicle they act to mount the cab onto the vehicle, for example by engaging a peg egressing from the detachable cab into a corresponding hole or groove in the vehicle. When the pegs are regressed, they act to release the cab from the vehicle, for example by disengaging a peg of the detachable cab from the corresponding hole or groove in the vehicle. In an embodiment, the pegs may be manufactured to include inner core fittings for supplying electrical power, delivering air, and/or transferring data. In such embodiments, the pegs may be multi-functional in that they are for example additionally capable of delivering air from the external environment into the detachable cab and/or transferring power or data, etc. from the amphibious vehicle to the detachable cab, while also mounting the cab to the vehicle. In an embodiment, the corresponding hole or groove for receiving a peg therein may comprise a seal or plug for sealing the hole or groove after the corresponding peg has regressed therefrom. For example, in such embodiments, the detachable cab may comprise a spring-loaded plug that is capable of automatically sealing the hole or groove once a peg is regressed therefrom.

In an embodiment, the detachment apparatus of the detachable cab is comprised of a latch which serves to lock the detachable cab to the amphibious vehicle. In an emergency, the latch is unlocked causing the cab to detach from the amphibious vehicle.

In an embodiment, the detachment apparatus is comprised of pyrotechnic fasteners which generally serve to fasten the detachable cab to the amphibious vehicle and enable detachment of the cab from the vehicle in an emergency through the explosion of charges embedded within the fasteners.

In an embodiment, the detachment apparatus is comprised of an electric, gas, hydraulic or mechanical release, or a combination thereof, which stores potential energy to provide adequate force needed to disconnect the detachable cab from the amphibious vehicle in event of an emergency. In an embodiment, detachment of the detachable cab from the amphibious vehicle may be by a gravity-controlled mode of operation after the cab is disconnected from the vehicle.

The detachment apparatus may be at one or more different positions on the detachable cab. In an embodiment, the detachment apparatus is located at the bottom, top, sides, front or back of the detachable cab, or any combination thereof. In an embodiment, the detachment apparatus is positioned on a module that is located between two separate and opposite enclosures (e.g. a front-facing and a rear-facing enclosure) of the detachable cab. The module between the enclosures may house an ejection arm which will be attached to the bottom, top or one or both sides of the module.

Other means of configuring and employing a detachment apparatus that will manually or automatically detach the cab from the amphibious vehicle would be appreciated by a skilled person having regards to the present disclosure.

In certain embodiments, the detachable cab is configured for automated detachment of the cab from the amphibious vehicle in an emergency, such as under upset conditions. By "automated detachment", it is meant that the detachable cab becomes detached from the amphibious vehicle without any action of the operator. Rather, the detachment is in response to a condition indicative of an emergency. The automated detachment may be by an active disengagement system or may be a passive system, such as for example those described below.

In an embodiment where the emergency is an upset condition, the upset may trigger automatic detachment of the cab from the amphibious vehicle by implementing equipment that measures the inclination of the amphibious vehicle and automatically detaches the cab when a threshold tilt level of the amphibious vehicle is exceeded. By "threshold tilt level", it is meant a certain degree of tilt at or above which the amphibious vehicle registers an upset. In an embodiment, the threshold tilt level is about 10 degrees, about 15 degrees, about 20 degrees, about 25 degrees, about 30 degrees, about 35 degrees, about 40 degrees, about 45 degrees, or more. In an embodiment, the threshold tilt level is at least 25 degrees of tilt. Any degree of tilt of the amphibious vehicle beyond the threshold tilt level will trigger automatic detachment of the cab from the amphibious vehicle.

In an embodiment where the emergency involves an influx of water into the detachable cab, the rising water level in the cab may trigger automatic detachment of the cab from the amphibious vehicle by implementing equipment that measures the water level inside the cab and automatically detaches the cab when a threshold water level is exceeded. By "threshold water level", it is meant a certain depth of water in the cab at or above which the amphibious vehicle registers an emergency situation. In an embodiment, the threshold water level is between about 6 inches and 24 inches of water. In an embodiment, the threshold water level is at about 6 inches, about 7 inches, about 8 inches, about 9 inches, about 10 inches, about 11 inches, about 12 inches, about 13 inches, about 14 inches, about 15 inches, about 16 inches, about 17 inches, about 18 inches, or more of water. In an embodiment, the threshold water level is at about 12 inches of water. Any depth of water in the amphibious vehicle beyond the threshold water level will trigger automatic detachment of the cab from the amphibious vehicle.

Those skilled in the art, with the benefit of the present disclosure, will recognize that using a threshold tilt level or a threshold water level as a trigger for cab detachment enables the operator to escape from an amphibious vehicle that is about to topple over or is being flooded. It may be beneficial to have the process automated in the event that the emergency renders the operator incapacitated. Also, the operator may not be quick enough to respond before a critical point, thus favoring automated detachment in appropriate situations. Those skilled in the art will understand that the angle of the tilt threshold may vary, and may be set accordingly, depending on the type of amphibious vehicle and operating conditions. Likewise, the acceptable water depth inside the cab may vary, and may be set accordingly, depending on the type of amphibious vehicle and operating conditions. In an embodiment, the detachable cab may include one or multiple mechanisms of automated detached, such as for example both a tilt threshold level and a water threshold level.

In other embodiments, no mechanical operation is required and the automated detachment is by a passive system detachment apparatus, such as one that relies on gravity and/or balance. For example, in an embodiment, detachment of the detachable vehicle is automatic upon tilt or upset of the amphibious vehicle and requires no operational disengagement procedures at all, whether automated or manual.

In an embodiment of such a passive system, the detachable cab may be positioned on the amphibious vehicle within a recess in the amphibious vehicle or vice versa the detachable cab may have a recess on its outer surface that rests on a complementary surface on the amphibious vehicle. The recess may function, for example, as a saddle in which the detachable cab rests and remains seated due to gravity and/or balance forces when the amphibious vehicle is in proper operational orientation. For example and without limitation, the recess may be a crater-type shape in which the detachable cab sits. The crater-type shape may conform to the bottom surface of the detachable cab or a portion thereof. In select embodiments, the recess may include biasing members that aid in retaining the detachable cab in position when the amphibious vehicle is in proper operational orientation. However, upon an emergency situation such as tilt or upset, the detachable cab may passively detach from the amphibious vehicle by coming out of the recess. In the absence of biasing members, this may simply involve the gravitational and balance forces causing the detachable cab to fall out of the recess. In the presence of biasing members, this may further involve the gravitational and balance forces overcoming the bias imposed by the biasing members.

As exemplary embodiments, the biasing members may be a lip or curved edge positioned at or near the top edge of the recess. The lip or curved edge may protrude slightly into the recess, thereby acting as a biasing member against the detachable cab when positioned in the recess. In other embodiments, the biasing members may be of a tongue-and-groove configuration. For example, there may be grooves in the surface of the recess into which a tongue on the detachable cab fits into when positioned in the recess. The biasing members may include a break-away component, such that when gravitational and/or balance forces cause the detachable cab to shift in an emergency, the break-away component of the biasing member may break to allow the detachable cab to detach from the amphibious vehicle.

In other embodiments, the detachable cab may be balanced or positioned on a projection within the recess. The projection may be in the center of the recess and allow for rotational movement of the detachable cab. In this manner, the detachable cab may be capable of rotating to face in different directions on the amphibious vehicle. In an emergency, the detachable cab could passively disengage from the projection to detach from the amphibious vehicle.

In certain embodiments, the detachable cab is configured for manual detachment of the cab from the amphibious vehicle. By "manual detachment", it is meant that the detachable cab becomes detached from the amphibious vehicle by an action performed by the operator. In some embodiments, the detachable cab is configured for manual detachment and automatic detachment. In such embodiments, an operator may be able to manually detach the detachable cab in the event that the automatic detachment fails.

In an embodiment, the detachable cab comprises a manual quick release mechanism to detach the cab from the amphibious vehicle. An example of a manual quick release mechanism includes, but is not limited to, a button that the operator can press thereby engaging the detachment apparatus, thus triggering the detachment of the cab from the amphibious vehicle. Another example of a manual quick release mechanism includes, but is not limited to, a lever that the operator can pull on or move thereby engaging the detachment apparatus, thus triggering the detachment of the cab from the amphibious vehicle. Those skilled in the art, with the benefit of the present disclosure, will appreciate that a manual means to detach the cab from the amphibious vehicle provides the operator with additional escape assurance, which can be particularly beneficial in circumstances where automated detachment is difficult to implement or inappropriate in the operation circumstances, or if the automated detachment mechanism fails.

In an embodiment, the detachable cab is jettisoned from the amphibious vehicle upon activation of the detachment apparatus (manually or automatically). As used herein, "jettisoned" is meant to refer to a situation where the detachable cab is actively and/or forcibly deployed from the amphibious vehicle such that the cab is cast away from the amphibious vehicle. In an embodiment, by jettisoning of the detachable cab, the cab is not within the vicinity of the amphibious vehicle after detachment. In this context, "vicinity" refers to a distance that is within 6 feet or less of the amphibious vehicle. In an embodiment, a jettisoned cab will be at a distance away from the amphibious vehicle to thereby prevent the compromised amphibious vehicle from causing damage to the detached cab by, for example, limiting the probability that the amphibious vehicle will collapse on the detached cab or even contact the detached cab. In an embodiment, the detachable cab is jettisoned between about 6 feet and 50 feet away from the amphibious vehicle. In an embodiment, the detachable cab is jettisoned between at least 10 feet, at least 15 feet, at least 20 feet, at least 25 feet, or more away from the amphibious vehicle. An advantage of detaching the cab from the amphibious vehicle in a jettisoned manner is that it enables the operator to escape the spatial proximity of the emergency.

In an embodiment, the component(s) that provide the jettisoning of the detachable cab is a structure or assembly on the amphibious vehicle to which the cab is reversibly attached. The assembly that jettisons the detachable cab from the amphibious vehicle may be associated with the detachment apparatus of the detachable cab or may be a separate apparatus (e.g. jettison apparatus) that is activated upon detachment of the detachable cab from the amphibious vehicle.

In an embodiment, the detachable cab is configured to be jettisoned away from the amphibious vehicle by a spring-type action, gravity-based action, momentum-based action, or a launching mechanism. These actions or mechanism may be the result of a component or assembly of the detachment apparatus or a component or assembly separate from the detachment apparatus. In another embodiment, the detachable cab is configured to be jettisoned away from the amphibious vehicle by a propulsion means on the detachable cab. In other embodiments, any combination of these actions or mechanisms may be used to jettison the detachable cab. The spring-type action or launching mechanism may be activated commensurately with detachment of the cab from the vehicle. The propulsion means may be triggered sequentially after detachment of the cab from the vehicle. The propulsion means may comprise a mechanical propulsion source. Examples of a jettison mechanism having a mechanical propulsion may rely on propellers that enable the detached cab to travel in water, thrusters powered by fuel or compressed air, other propulsion means that are familiar to those skilled in the art, or any combination thereof.

An example of a launching mechanism may comprise a series of tracks and rollers. In an embodiment, the tracks are coupled to the deck of the amphibious vehicle on which the cab normally sits and the rollers are coupled to the bottom of the detachable cab. The rollers enable the cab to roll off the deck of the amphibious vehicle once detached, thereby facilitating the jettisoned detachment of the cab. In the aspect of the present disclosure where the detachment of the cab is triggered when the amphibious vehicle exceeds a certain tilt threshold, it will be appreciated that gravity will enable the track-roller system to jettison the cab off the amphibious vehicle in a manner not reliant on a mechanical power source. In other embodiments, the track on the amphibious vehicle may provide a gradient sloped downwardly off the vehicle, thereby facilitating rolling of the detachable cab off the vehicle.

Those skilled in the art will appreciate that lower development costs may be realized through the implementation of a jettison mechanism lacking a mechanical propulsion system as compared to a jettison mechanism having a mechanical propulsion on the detachable cab. Thus, in a preferred embodiment the jettisoning is accomplished without a mechanical propulsion on the detachable cab. Nevertheless, in other embodiments, it may be desirable to combine a jettison mechanism having a mechanical propulsion with a jettison mechanism not having a mechanical propulsion, such as the spring-type action or launching mechanism described herein.

In an embodiment, the detachable cab and the amphibious vehicle are interconnected by the detachment apparatus, meaning that the same mechanism or components that function to detach the cab from the vehicle also provide the structure necessary to interconnect the cab and the vehicle. In another embodiment, the detachable cab and the amphibious vehicle are interconnected by a structure that is independent of the detachment apparatus (e.g. a solid frame). In this later embodiment, components associated with the structure that connects the two are responsible for the detachment.

The detachable cab is comprised of an independent flotation system. By "independent flotation system", it is meant that the detachable cab comprises its own flotation system that is independent of the amphibious vehicle. The detachable cab is thus capable of floating on its own when detached from the amphibious vehicle. The independent flotation system may comprise any means of flotation that is capable of supporting the weight of the detachable cab and operator(s) in allowing the structure to float. In an embodiment, flotation is a natural consequence of the design of the detachable cab and materials used, such that the cab will float immediately upon detachment from the amphibious vehicle. In other embodiments, the independent flotation system is a flotation means that can be activated manually or automatically at any time before, after or during detachment, such as manual activation of an inflatable airbag or balloon.

By "independent" it is meant that the detachable cab is capable of floating when it is detached from the amphibious vehicle. It is contemplated that a component or system associated with the independent flotation system may be contained in or on the amphibious vehicle (e.g. air tanks for inflating inflatable airbags or balloons). For example, in an emergency inflation of airbags on the vehicle cab may be by an inflation system found on the amphibious vehicle. In a preferred embodiment, any component or system contained on the amphibious vehicle that is associated with the flotation system of the vehicle cab is not required by the cab for flotation immediately or shortly after the cab detaches from the vehicle.

The independent flotation system should be shaped and/or positioned on or within the detachable cab in a manner to enable upright and stable flotation of the detachable cab. The shape and/or position of the independent flotation system will differ depending on the physical characteristics of the detachable cab and desired operation parameters/conditions.

In an embodiment, the independent flotation system is provided by the material or materials in which the detachable cab is made. In such embodiments, the detachable cab should comprise enough of the material to allow the cab to float. Generally, materials that have a density that is less than water will float. Exemplary materials are wood, low density rubber, low density plastic (e.g. polyethylene, polypropylene, etc.), cork, and Styrofoam. In an embodiment, the independent flotation system is provided by the shape of the detachable cab, whereby the shape holds air such that even if the cab is made of materials having a density greater than the water, the cab will float. In further embodiments, some or all of the flotation may come from the detachable cab displacing a sufficient volume of water to allow the detachable cab to float. For example, the detachable cab may be made primarily of a material that does not itself float (e.g. metal) and flotation will be provided in part or whole by displacement of the water. In such embodiments, the independent flotation system is more defined by the shape of the detachable cab (e.g. the lower buoyant framework of the core frame structure), rather than it being comprised of a material or structure to provide flotation.

In an embodiment, the independent flotation system is provided by a combination of the materials and shape of the cab. In other embodiments, flotation materials are added or attached to the detachable cab to provide the independent flotation.

In an embodiment, the independent flotation system is composed of strong, lightweight and waterproof materials such as a composite material comprising polyurethane foam encapsulated in fiberglass cloth sealed with epoxy or polyester resin, any other like materials known those skilled in the art, or any combination thereof.

In an embodiment, the independent flotation system is a polyurethane spray foam, such as VERSI-FOAM® (VERSI-FOAM is a registered trademark of RHH Foam Systems Inc., New Berlin, WI, USA). The spray foam may be applied within any component of the detachable cab to aid in its flotation. In an embodiment, the spray foam is applied in a region underneath the enclosure that houses the operator, similar to the hull cavity of a boat. The spray foam may also be used to encapsulate equipment of the detachable cab to protect it in the event of an emergency, such as in a structure or enclosure housing the life-saving equipment (e.g. oxygen tanks). If the detachable cab comprises its own fuel tank, it may be insulated with the spray foam.

In an embodiment, the independent flotation system is a molded structure made of, for example, a lightweight foam or alternative material (e.g. Aerogel™). The molded flotation material may be applied within or on any component of the detachable cab to aid in its flotation. In an embodiment, the molded flotation material is attached to a region underneath the enclosure that houses the operator, similar to the hull cavity of a boat, such as within the lower buoyant framework described above. In an embodiment, the molded flotation material is attached to a region along one or more sides of the detachable cab. The molded flotation material may also be used to encapsulate equipment of the detachable cab to protect it in the event of an emergency, such as in a structure or enclosure housing the life-saving equipment (e.g. oxygen tanks). If the detachable cab comprises its own fuel tank, it may be insulated with the molded flotation material.

In an embodiment, the independent flotation system comprises or is contained within a structure that extends outwards from the enclosure. In an embodiment, the structure is located near or at the bottom of the enclosure that houses the operator. The structure may be multi-functional. For example, as shown in FIG. 1, a component of the independent flotation system may form a step just outside and below the doors of the detachable cab. This step may assist the operator in getting into and out of the cab, and may also be of a design to assist in self-righting of the cab upon detachment into water. It may also aid in keeping the detachable cab level in the water.

In an embodiment, the independent flotation system may comprise inflatable airbags or balloons. In an embodiment, the airbags or balloons are inflated in response to an emergency. In an embodiment, inflation of the airbags is automatically activated upon detachment of the cab from the amphibious vehicle. The airbags or balloons may be positioned on or within the detachable cab at positions that will assist in the flotation of the cab, and their positioning will be dependent on the physical characteristics of the cab. In an embodiment, the airbags or balloons may be inflated by the operator to raise the vehicle cab out of the water. For example, the vehicle cab may have become submerged and the operator can inflate the airbags or balloons to raise the detachable cab out of the water.

The independent flotation system may further comprise a propulsion mechanism, such as propellers, that facilitate the flotation of the detached cab.

In a preferred embodiment, the independent flotation system of the detachable cab is configured to be self-righting such that the cab will return to an upright position without intervention in the event that the detached cab becomes upset or overturned in water or is detached from the amphibious vehicle in a non-upright orientation. In an embodiment, the detachable cab is configured to be self-righting by strategically distributing stationary weight and buoyancy, for example by using inflatable airbags or movable ballast, or any combination thereof.

In an embodiment, the detachable cab further comprises life support equipment for the operator. The life support equipment may be useful in a number of situations, such as for example the detachable cab becomes trapped underwater or the operator is forced to remain in the detached cab for a lengthy period of time. The life support equipment may also be useful in the event that the operator is injured during the emergency.

The life support equipment may include any number of common life support and/or first aid apparatuses. In an embodiment, the life support equipment includes a breathing apparatus for the operator. The breathing apparatus is preferably located within the enclosure that houses the operator, although components thereof (e.g. oxygen tank) may be located in other compartments or enclosures. The breathing apparatus is configured to provide oxygen to the operator. In an embodiment, within the enclosure may be one or more mouthpieces that are connected to an onboard oxygen supply by hoses. The onboard oxygen supply may, for example, be a compressor or bottled oxygen. In another embodiment, self-contained emergency oxygen kits may be provided within the enclosure that houses the operator (e.g. a short term oxygen supply unit, such as bottled oxygen connected to a mouthpiece). In an embodiment, within the enclosure there may be an air conduit that is in communication with the external environment. Any combination of these sources of oxygen may used.

In an embodiment, the detachable cab has the ability to plug into remote systems for life support. For example, the detachable cab may be configured to receive a source of oxygen, communication, heat, or any combination thereof from shore or from another vessel or vehicle. In an embodiment, this may be achieved by connection of a hose supplying such life support to one or more ports on the external surface of the detachable cab. Thus, in the event that the detachable cab were to become submerged (e.g. pinned under water), external life support systems could be connected to the cab to provide life support to the operator.

In embodiments where the detachable cab is a sealed unit upon detachment, it may also be advantageous for the enclosure that houses the operator to contain a carbon dioxide scrubber to prevent the harmful buildup of carbon dioxide with the enclosure.

On occasion, emergencies may be so severe that the operator becomes unconscious. In such a situation, the operator may be unable to use the life support equipment (e.g. breathing apparatus) within the cab. Therefore, in an embodiment, the detachable cab further comprises means to recycle the air inside the enclosure, such as for example oxygen-generation equipment, carbon dioxide scrubbers, air filters and purifiers, air humidity regulators, equipment that enables the expulsion of stale air from the detached cab such as an air conduit, or any combination of equipment thereof.

In a further aspect, it may be preferred that the detachable cab comprise a water inlet conduit configured to create equilibrium between the cab and extraneous water in order to provide the occupant additional time to escape. In an embodiment, the water inlet conduit is a valve that the operator can manually open to control the flow of water into the enclosure that houses the operator in order to generate an equilibrium. This is advantageous because, in some circumstances, if an operator were to simply break a window, this could have an incapacitating effect and potentially harm the occupant. Thus, the detachable cab will protect the operator for a sufficient time that an appropriate escape can be identified by the operator. This is particularly relevant when the detachable cab is partially or fully submerged in water. Irrespective of the detachable cab having an independent flotation system, it is contemplated that in some emergencies the detachable cab may become submerged partially or completely under water (e.g. trapped or pinned under water).

In a further aspect, this water inlet conduit or valve may also allow the operator to understand the material that they are submerged in. For example, if the operator were to open the valve and a thick ooze of mud comes in, the operator would know that they cannot egress that way. In this regard, in further embodiments, the detachable comprises two or more water inlet conduits. These water inlet conduits may be on opposing sides of the enclosure that houses the operator, and/or on the top and bottom. Thus, the operator could open any one or more of the water inlet conduits or valve to determine if the situation is different on alternate sides, the top or the bottom of the detachable cab. This may be particularly important in situations where the detachable cab is in an orientation other than right side up.

In a further embodiment, the detachable cab comprises a device that provides the operator with the orientation of the detachable cab relative to the horizon, e.g. so the operator would know if they were upside down, on their side, etc. This would assist the operator in knowing which way to travel when egressing the detachable cab, such as in a submerged state where the water is dark and cloudy.

It is foreseeable that in certain emergencies the door of the enclosure of the detachable cab may become blocked or jammed. In an embodiment, the enclosure that houses the operator may comprise more than one door and/or further comprise an emergency escape passageway. In an embodiment, the enclosure includes an emergency escape passageway other than a door. Whereas a door will typically include a window and an easy-to-open handle, it is contemplated that in an embodiment the escape passageway will be a solid hatch with a wheel-type handle. In an embodiment, the escape passageway may be located in the roof of the enclosure. Thus, if the majority of the detachable cab is submerged in water, the operator may be able to safely exit from the escape passageway.

In an embodiment, the escape passageway may comprise a detector or sensor to detect whether the passageway is submerged in water and a mechanism to alert the operator thereof. The inclusion of a detector or sensor may be particularly useful if the escape passageway does not include a window. The detector or sensor may provide an alert to the operator (e.g. visual or audible). The detector or sensor may automatically prevent the operator from opening the escape passageway, at least without the operator manually engaging an override mechanism. In an embodiment, the escape passageway may comprise a small view hole that the operator can look through to access the outside environment. This view hole may be used in combination with a detector or sensor system.

In an embodiment, the detachable cab comprises a battery to provide power to equipment on or within the detachable cab once detached from the amphibious vehicle. As will be appreciated, in some configurations, the detachable cab may primarily be supplied electricity by way of the amphibious vehicle. In such configurations, if the detachable cab is detached in the event of an emergency, the detachable cab will lose power. The battery may be used to power, for example, lights, life support apparatuses, sensors, detectors, and the like.

In an embodiment, the detachable cab is connectable to the amphibious vehicle by a structure that permits multi-directional movement of the cab on top of the amphibious vehicle. For example, when connected to the vehicle, the detachable cab is movable by pivotal movement, tilting movement, side-to-side movement, up and down movement, and/or forward and backward movement. Preferably, these motions can be controlled by the operator and/or are automatic in response to movement of the amphibious vehicle in water and other indicators in order to avoid upset conditions.

In an embodiment, the detachable cab is a single cab for housing a single operator within the enclosure. By "single cab", it is meant that the enclosure has a single seat. In another embodiment, the detachable cab is a side-by-side dual cab or an inline dual cab for housing one or more operators within the enclosure. By "dual cab", it is meant that the enclosure has more than one seat, either side-by-side or inline. In another embodiment, the detachable cab comprises two or more separate enclosures for housing an operator. For example, the detachable cab may have enclosures facing opposite directions (e.g. a front-facing enclosure and a rear-facing enclosure).

In an embodiment, the detachable cab may comprise a module in the middle or at the rear of the operator enclosure(s) to support additional equipment and configurations of the detachment apparatus and/or jettisoning apparatus. For example, in embodiments whereby the detachable cab has a front-facing and a rear-facing enclosure, a module may be present in between the enclosures to provide a structure that the detachment apparatus and/or jettisoning apparatus is attached. The module may alternatively or additionally comprise the life support systems as described herein. In another embodiment, the module may be positioned at the rear of a single cab or dual cab. Again, the module may provide a structure that the detachment apparatus and/or jettisoning apparatus is attached and may also, alternatively or additionally, comprise the life support systems.

The detachable cab of the present disclosure may be used with and connected to any type of amphibious vehicle, such as an amphibious excavator, ATV, UTV, truck, or car. In a preferred embodiment, the amphibious vehicle is an excavator. Amphibious excavators are frequently used in bodies of water (e.g. tailing ponds, muskegs, etc.) where an operator is not able to see the underwater terrain. Moreover, due to weight imbalances and a swinging excavator arm, amphibious excavators are particularly at risk of upset. Thus, in an embodiment, the amphibious vehicle is an amphibious excavator.

Accordingly, in other embodiments, the present disclosure relates to an amphibious vehicle comprising the detachable cab of the present disclosure.

In an embodiment, the amphibious vehicle may be an amphibious excavator, ATV, UTV, truck, car or any other amphibious vehicle.

In an embodiment, the amphibious vehicle is an amphibious excavator, whereby the amphibious excavator comprises a detachable cab of the present disclosure. In an aspect, the detachable cab of the amphibious excavator is a single cab embodiment. In an aspect, the detachable cab of the amphibious excavator is a dual cab embodiment. In an aspect, the detachable cab of the amphibious excavator may generally be as depicted in FIGS. 1-4 herein.

Embodiments of the present disclosure will now be described by reference to FIGS. 1-5, which are schematic representations of a detachable cab for amphibious vehicles in accordance with the present disclosure.

The detachable cab 10 comprises an enclosure 2 for housing the operator(s), an independent flotation system 4 and a detachment apparatus 6 configured for detachment of the cab from the amphibious vehicle under emergency conditions. As shown in the embodiment of FIGS. 1-5, the detachable cab comprises both a front enclosure 2a and a rear enclosure 2b.

The enclosures 2a and 2b comprise a body 8, a door 12 (12a and 12b), a front window 14 (2a only), a roll cage (partially shown as 16; also functions as a handle), an emergency escape passageway 18 (18a and 18b), and life support equipment (internal; not shown).

The door 12a/12b may be comprised of a waterproof carbon fibre board further comprising a rubber gasket permanently affixed around the entire perimeter on the inner side of the door 12a/12b. In the embodiment of FIGS. 1-5, the door 12a/12b swings out and away from the body 8 of the enclosure 2 when it is opened. When the door 12a/12b is closed, the gasket on the door 12a/12b couples to form a watertight seal with another gasket permanently affixed to the body 8 of the enclosure 2. Alternatively, the gasket may form a watertight seal directly against the body 8. A lock (not shown) or cam-type sealing means on the door presses the door 12 towards the body 8 of the enclosure 2, thereby ensuring that the watertight seal between the gasket of the door 12a/12b and the body 8 of the enclosure 2 is not easily compromised. The emergency escape 18a/18b may comprise a similar watertight sealing means. One or more emergency escape passageways may also be found in the floor of the detachable cab 10 (not shown). In an embodiment, there is an emergency escape passageway in the floor of each enclosure floor In the embodiment of FIGS. 1-5, the windows 14 are comprised of shatterproof or shatter-resistant, transparent plexiglass with a water impermeable sealing means. The door 12a/12b may also comprise a window.

In the embodiment of FIGS. 1-5, the independent flotation system 4 comprises polyurethane foam encapsulated in lightweight composite materials (e.g. fiberglass cloth sealed with polyester resin). The independent flotation system 4 is shaped like wings extending outwards from the bottom of the enclosure 2 for optimal stability while floating on water (e.g. self-righting and leveling). The independent flotation system 4 may further comprise inflatable airbags (not shown) and movable ballasts (not shown) which aids in self-righting and/or leveling of the detachable cab 2 from an upset or submerged condition.

The detachment apparatus 6 comprises a detachment means (e.g. hooks, latches, slidable pegs, etc) which, in a non-emergency state, lock and connect the detachable cab 10 to the amphibious vehicle (not shown). The detachment means (not shown) are manually unlockable from the inside of the enclosure 2 via a button or lever (not shown). Unlocking the detachment means results in detachment of the cab 2 from the amphibious vehicle. The detachment apparatus 6 may further comprise a mechanism that automatically unlocks the detachment means and detaches the cab 2 from the amphibious vehicle, e.g. when a tilt threshold is reached.

Figure 2:
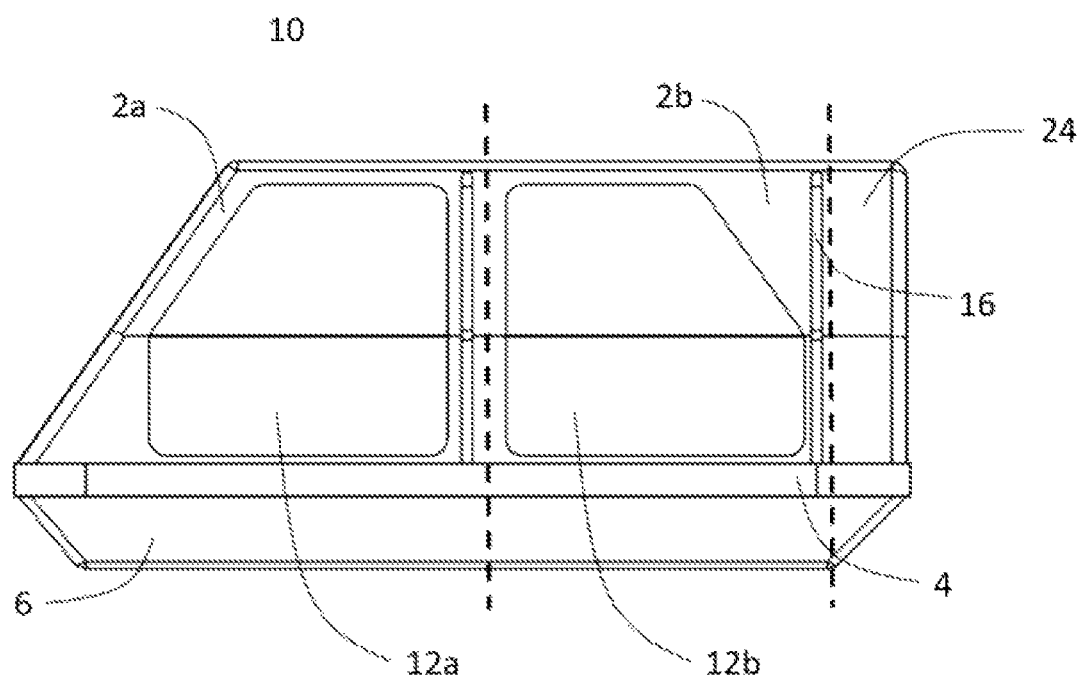
FIG. 2 shows a right end view of a detachable cab for amphibious vehicles in accordance with certain embodiments.
Figure 3:
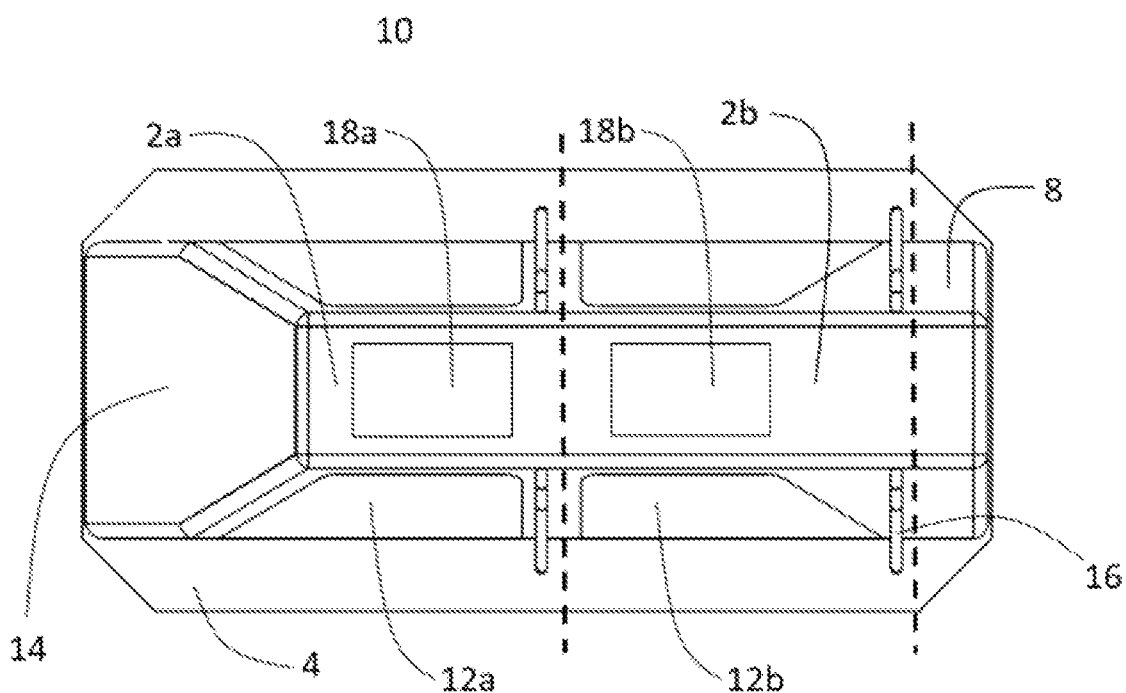
FIG. 3 shows a top view of a detachable cab for amphibious vehicles in accordance with certain embodiments.
Figure 4:
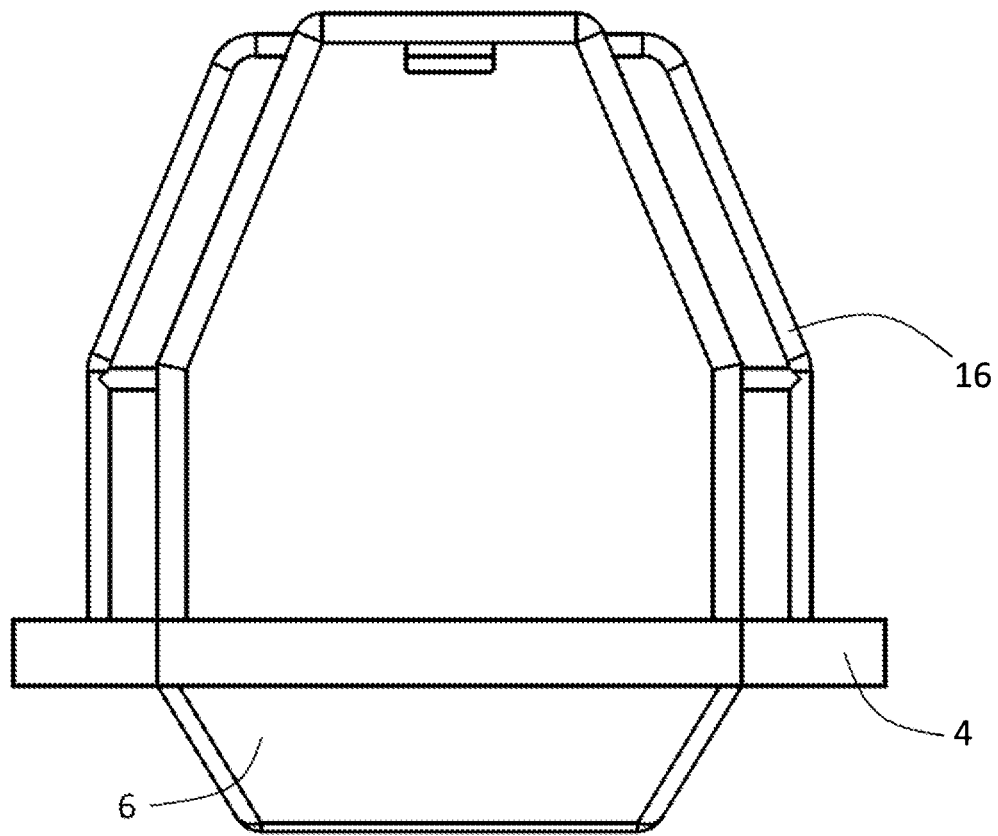
FIG. 4 shows a rear view of a detachable cab for amphibious vehicles in accordance with certain embodiments.

As shown in FIGS. 2 and 3, the detachable cab may be formed by modules. Module division lines (dotted lines) are shown in FIGS. 2 and 3, whereby the detachable cab has both a front operator enclosure 2a and a rear operator enclosure 2b as separate modules. The detachable cab of the present disclosure may be assembled with any number of modules. The modules may be operator modules, such as 2a or 2b, that serve as enclosures to house an operator. Alternatively, one or more of the modules may be used for storage, HVAC, fuse boxes, $CO_2$ scrubbers, breathing apparatuses, other life support systems, etc., or any combination thereof (e.g. rear module 24 in FIG. 2). The modules provide flexibility in configuring detachable cabs to suit various purposes and to be configurable for various different amphibious vehicles, including being retrofitted to an existing amphibious vehicle.

Figure 5:
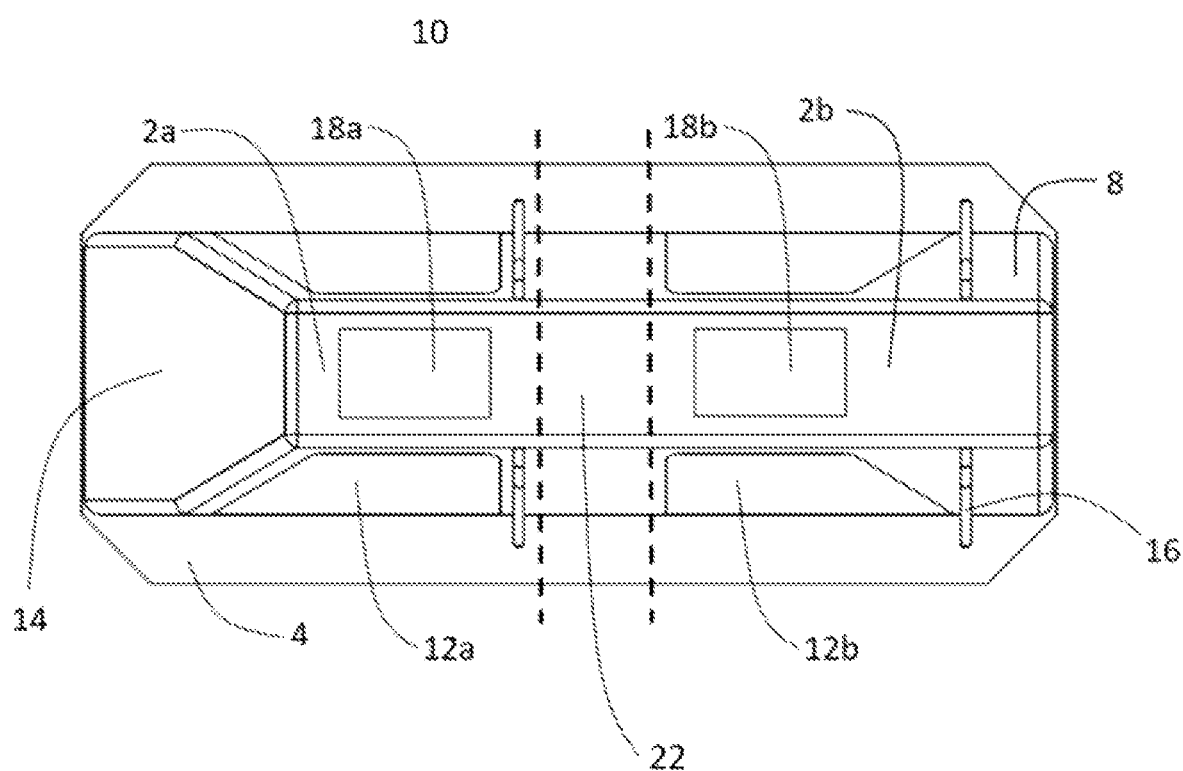
FIG. 5 shows a top view of a detachable cab for amphibious vehicles in accordance with certain embodiments.

As shown in FIG. 5, in an embodiment a module 22 can be placed between operator enclosures 2a and 2b. As described herein, the detachment apparatus may be positioned on such a module 22 that is between two separate and opposite enclosures of the detachable cab 10. This arrangement may be particularly useful when the detachable cab 10 is to be used on an excavator. In an alternative arrangement, module 22 may be at the rear of the detachable cab 10 to provide an even larger rear module than that shown in FIG. 2. This may be particularly suitable for detachable cabs that are a single cab or a dual cab in which the operators face the same direction (e.g. for a truck). As with the modules described above, module 22 or the may be used for storage, HVAC, fuse boxes, $CO_2$ scrubbers, breathing apparatuses, other life support systems, etc., or any combination thereof.

The modules may be independent of each other or not. In this context, by "independent" it is meant that each module needs its own egress (e.g. door) and likewise may comprise its own emergency escape passageways and life support equipment. In an embodiment, each independent operator module has at least one emergency escape passageway. The life support equipment may be shared between the operator modules, such as for example when module 22 is positioned between the operator modules.

Figure 6:
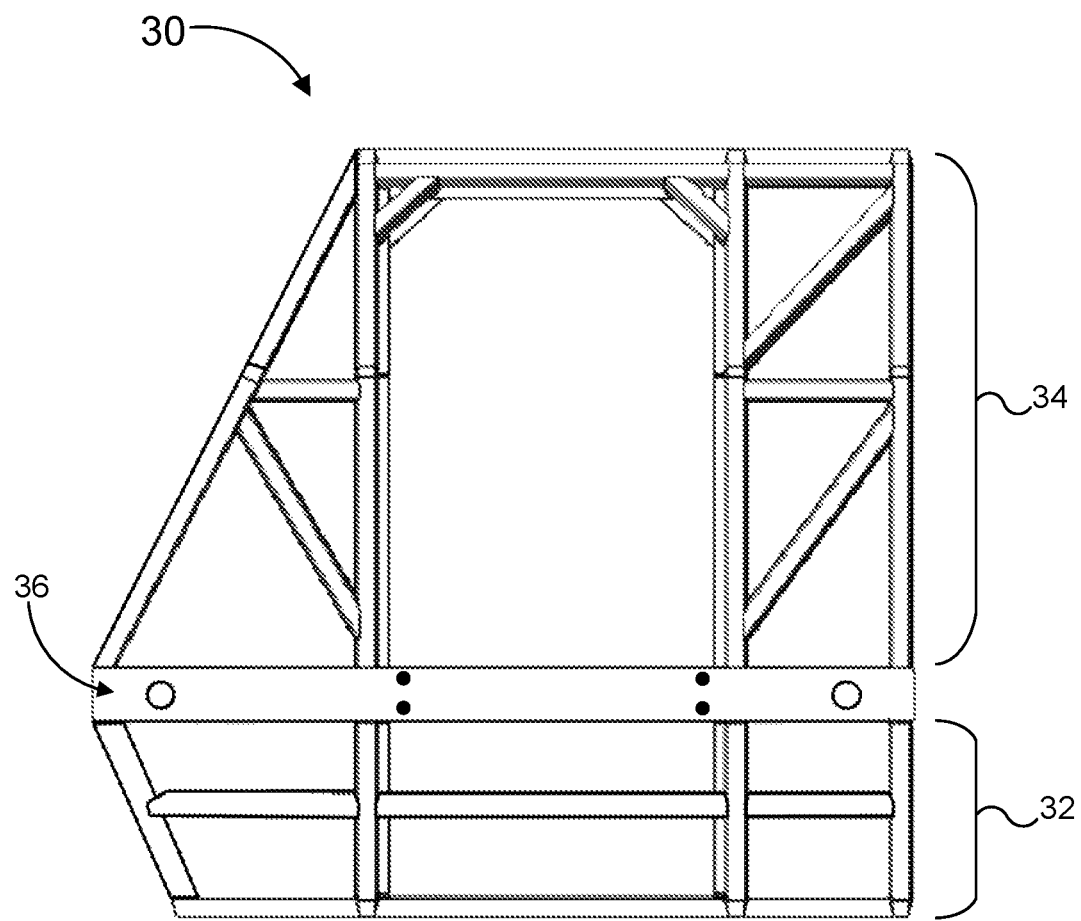
FIG. 6 shows a side view of a core frame structure for an enclosure of a detachable cab for an amphibious vehicle in accordance with certain embodiments.

FIG. 6 shows a core frame structure 30 of an enclosure according to an embodiment of the present disclosure. The core frame structure 30 comprises a lower buoyant framework 32, an upper protective framework 34, and a subframe 36 interconnecting the frameworks 32, 34. In the illustrated embodiment, frameworks 32, 34 are comprised of formed metal sections having an FRP core material therein, while the subframe 36 is comprised of metal formed sections having a C-shaped profile. The formed metal sections are welded together to form the frameworks 32, 34 and the subframe 36, which, in turn, are then welded together to form the core frame structure 30. As described above, there may be secured to the frameworks 34, 36 and the subframe 38, an exterior shell (not shown) and/or an interior shell (interior), and mounted in the frameworks 34, 36, at least one window and at least one door to thereby produce an enclosure such as the enclosure 2 illustrated in FIG. 1.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of" or "consist of" the various components and steps." Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A detachable cab for an amphibious vehicle, the detachable cab comprising:
   an enclosure for housing an operator,
   an independent flotation system; and
   a detachment apparatus configured for detachment of the cab from the amphibious vehicle,
   wherein, when connected to the amphibious vehicle, the detachable cab is movable by pivotal movement, tilting movement, side-to-side movement, up and down movement, and/or forward and backward movement, and wherein such movements are automated and are in response to indicators configured to avoid upset conditions.

2. The detachable cab of claim 1, wherein the detachment apparatus is configured for automated detachment of the cab from the amphibious vehicle under upset conditions.

3. The detachable cab of claim 1, comprising a quick release mechanism adapted to enable the operator to manually detach the cabin from the amphibious vehicle.

4. The detachable cab of claim 1, wherein the cab is jettisoned from the amphibious vehicle upon activation of the detachment apparatus.

5. The detachable cab of claim 1, wherein the enclosure comprises a roll cage and a sealing means to restrict the passage of water into the enclosure.

6. The detachable cab of claim 1, wherein the enclosure comprises thermal insulation.

7. The detachable cab of claim 1, wherein the independent flotation system is configured to enable the cabin to self-right and float when detached.

8. The detachable cab of claim 1, wherein the independent flotation system is comprised of a spray foam, molded foam, or a composite material comprising polyurethane foam encapsulated in fiberglass cloth sealed with epoxy or polyester resin.

9. The detachable cab of claim 1, wherein the cab comprises life support equipment for the operator.

10. The detachable cab of claim 9, wherein the life support equipment comprises a breathing apparatus within the enclosure that provides oxygen to the operator from an oxygen tank onboard the cab, an air conduit in communication with the external environment, a carbon dioxide scrubber, or any combination thereof.

11. The detachable cab of claim 1, which further comprises an emergency escape passageway from the enclosure, the emergency escape passageway comprising a detector to detect whether the emergency escape passageway is submerged in water.

12. The detachable cab of claim 1, which is:
   a single cab for housing a single operator within the enclosure, or
   a side-by-side dual cab or an inline dual cab for housing one or more operators or a single operator and other occupants within the enclosure.

13. The detachable cab of claim 1, further comprising a water inlet conduit configured to create equilibrium between the cab and extraneous water and provide the occupant additional time to escape.

14. The detachable cab of claim 1, wherein the detachment apparatus comprises one or more slidable pegs for egressing into and regressing from one or more corresponding holes or grooves.

15. The detachable cab of claim 14, wherein at least one of the one or more slidable pegs comprises an inner core fitting for supplying electrical power, delivering air, transferring data, or a combination thereof.

16. The detachable cab of claim 1, wherein the enclosure comprises a core frame structure, which comprises:
   an upper protective framework for protecting the operator and supporting components of the enclosure therein;
   a lower buoyant framework for providing buoyancy to the enclosure; and
   a subframe for interconnecting the upper protective framework and the lower protective framework.

17. The detachable cab of claim 16, further comprising an exterior shell secured to the core frame structure.

18. The detachable cab of claim 16, further comprising an interior shell secured within the core frame structure.

19. An amphibious vehicle comprising the detachable cab of claim 1.

* * * * *